Nov. 19, 1929.                H. G. PONTING ET AL                1,736,730
                               FILM HANDLING APPARATUS
                     Original Filed March 11, 1922    2 Sheets-Sheet 1
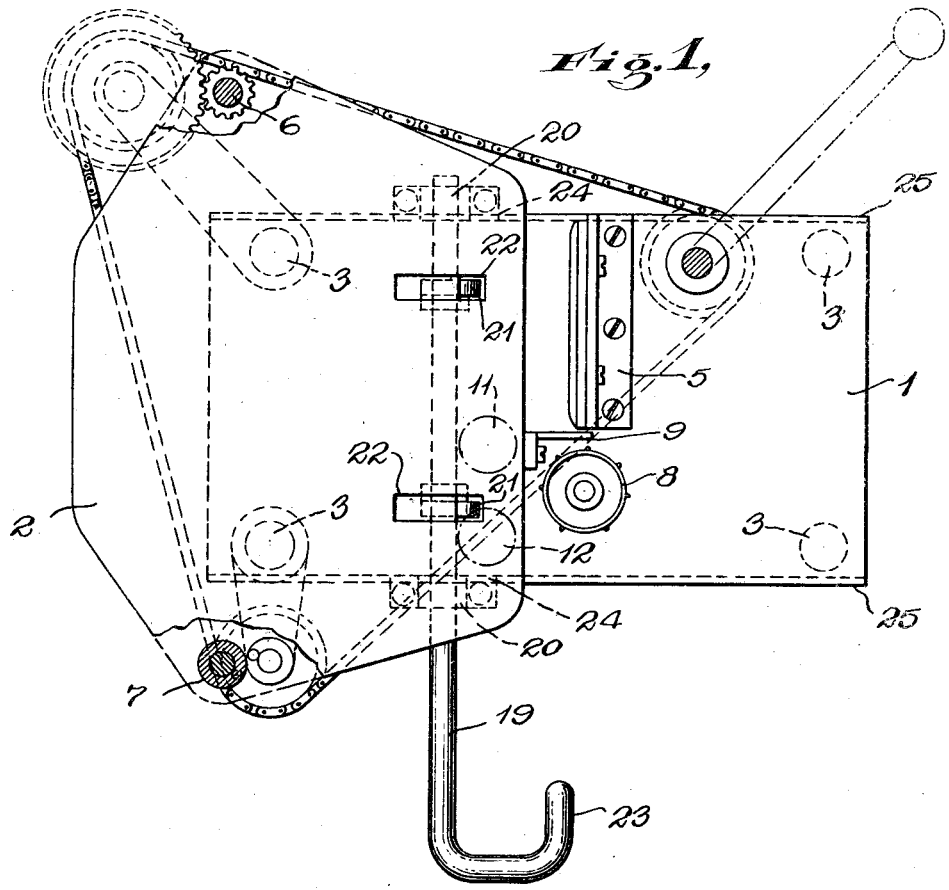
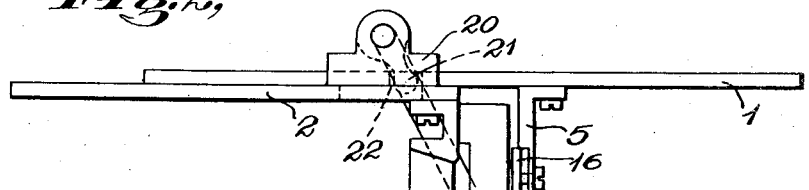
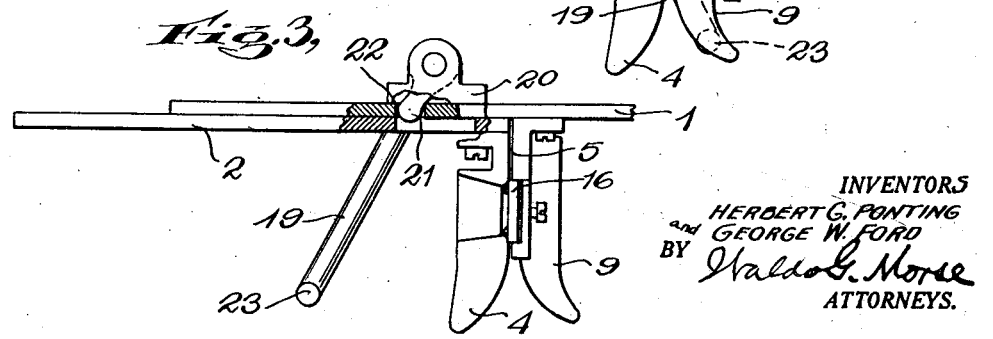
INVENTORS
HERBERT G. PONTING
and GEORGE W. FORD
BY Waldo G. Morse
ATTORNEYS.

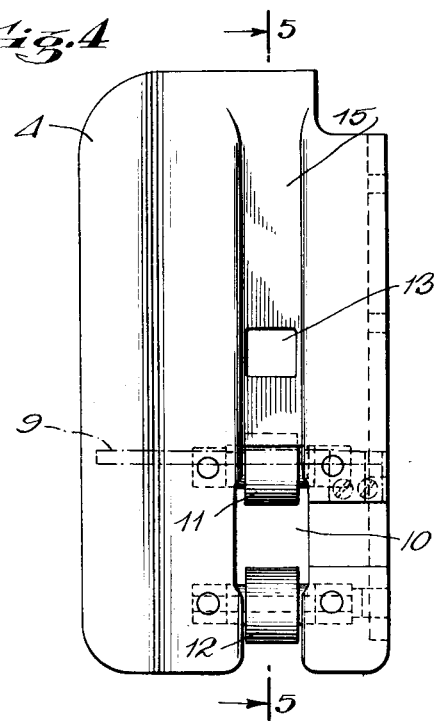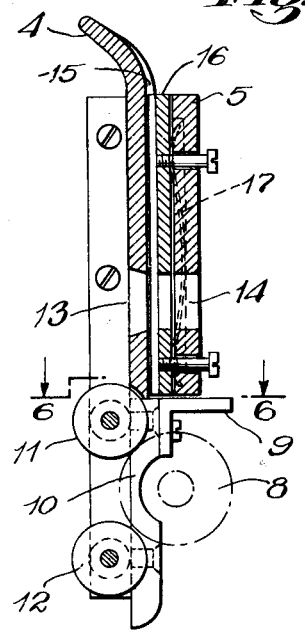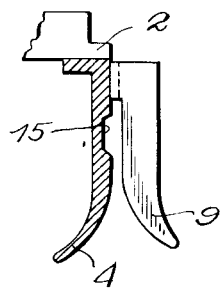

Patented Nov. 19, 1929

1,736,730

UNITED STATES PATENT OFFICE

HERBERT GEORGE PONTING, OF OXFORD CIRCUS, LONDON, AND GEORGE WILLIAM FORD, OF KENSINGTON, LONDON, ENGLAND, ASSIGNORS TO WARREN DUNHAM FOSTER, OF WASHINGTON TOWNSHIP, NEW JERSEY

FILM-HANDLING APPARATUS

Original application filed March 11, 1922, Serial No. 542,898, and in Great Britain March 30, 1921. Divided and this application filed September 16, 1929. Serial No. 392,890.

This invention relates to film handling or kinematographic apparatus—that is projector or camera apparatus—or to any art in which a strip of material is positively fed, as by a toothed member which coacts with perforations in the material. The present invention is particularly useful as applied to the gate and control mechanism therefor in film handling apparatus designed for domestic use, as contrasted with public kinematographic display. Heretofore the operation of threading the film through the gate and in operative relation with the various film handling members has been a difficult and tedious one. The present invention has for one of its objects improvements whereby the initial positioning of the film in the apparatus is greatly expedited, as well as its removal therefrom, and, if desired, its re-winding therein previous to such removal. A principal object of the invention is to provide a member adapted for the bodily removal of the film from the feeding member, as when the gate is opened, as for a film changing or rewinding operation, such member also serving to prevent the film from fouling the feeding member as a film is being initially positioned within the gate prior to the regular film feeding operation and preferably also serving to cooperate with other members to guide the film during such initial positioning.

Included among the objects of the present invention is the provision of an improved gate, means for properly guiding and positioning a film in such gate and in relation to the feeding member adapted to move the film therethrough, means for bodily removing the film from such feeding member, and a simple and effective interlocked control mechanism for all of the foregoing elements, such control mechanism preferably including a unitary actuating handle. A further object is the provision of guiding means which cooperate with the gate and the various parts of the apparatus associated therewith to facilitate the original positioning of the film in reference to such parts and its removal therefrom.

Other and further advantages both of construction and operation will be apparent from the following specification and drawings constituting a part thereof. In these drawings there is shown for purposes of illustration only a certain preferred embodiment of the present invention, it being understood that the drawings do not define the limits of our invention as changes in the construction and operation disclosed therein may be made without departing either from the spirit of our invention or the scope of the broader claims.

In the drawings:

Figure 1 is a side elevation of the gate and associated portions of the apparatus, partially in section, certain parts being omitted for clarity, showing the gate in the open or film threading position;

Figure 2 is a partial enlarged plan view corresponding to Figure 1 showing the gate and the operating mechanism therefor in the "gate open" or threading position;

Figure 3 is a view similar to Figure 2 but showing the operating mechanism in the "gate closed" or projecting position;

Figure 4 is an enlarged detail view of the rear or movable portion of the gate looking toward the front face thereof;

Figure 5 is a sectional view on the line 5—5 of Figure 4 looking in the direction of the arrows and including a portion of the fixed gate section;

Figure 6 is a view taken on the line 6—6 of Figure 5 looking in the direction of the arrows.

The gate structure of the apparatus includes a fixed plate 1, which is mounted in the apparatus in any desired manner, as, for example, by the pillars 3, as is described in our co-pending parent application to which reference has previously been made. Upon the fixed plate 1 in a manner and for a purpose which will later become apparent, a sliding plate 2 is slidably mounted. The sliding plate 2 carries the rear or movable portion of the gate together with the paying out or rewinding spindle 6 and the taking-up spindle 7.

The front or fixed half 5 of the gate is attached to and projects forwardly from the fixed plate 1. It will therefore be understood that the disposition of the parts is such that sliding movement of the sliding plate 2 upon the fixed plate 1 causes the gate to be opened and closed, and when open gives access to the mouth of the gate so that a film may be inserted between the sections thereof or removed from the space therebetween.

The rear portion 4 of the gate has three of its edges curved, namely, the upper and lower and that which forms one side of the mouth of the gate and which projects in that direction towards which the free ends of the film spool spindles project. The film-sprocket 8 is carried on the fixed plate 1 just beyond the delivery end of the gate, and a guide piece 9 is provided projecting forwardly from the rear portion 4 of the gate and carried thereby so as to pass between the delivery end of the gate and the film sprocket 8. This guide 9 is in the form of a nose-piece whose free end projects towards the mouth of the gate. That edge of the nose-piece which is towards the rear half of the gate is curved to assist in guiding the film into the gate when it is being initially positioned therein, as will be clearly apparent from Figures 2, 3 and 6.

The rear or movable section 4 of the gate has an opening 10, as is clearly shown in Figures 4 and 5, which allows the film sprocket to project therethrough when the gate is closed. Above and below this aperture are mounted guide rollers 11 and 12 by means of which, when the gate is closed, the film is lapped around part of the film-sprocket periphery and so is drivingly engaged therewith. On the other hand, when the gate is opened, the film is free of the said engagement with the sprocket since it is drawn by the stripper or nose piece 9 clear of the sprocket and an open track is provided for the film through the gate and its associated parts.

As is common in the art, within the movable gate section 4 and the fixed gate section 5, there are provided apertures 13 and 14. The rear or movable portion 4 of the gate is provided with a relatively deep film track 15 for guiding the film. Attached to the fixed gate section 5 may be provided the conventional pressure plate 16 which is urged against the film guiding depression 15 as by the spring 17.

The gate operating mechanism includes a spindle or shaft 19 carried in bearings 20 affixed to the sliding plate 2, one above and the other below the fixed plate 1. The said gate-opening shaft 19 carries two crank arms 21 which engage the openings 22 in the said fixed plate 1 and project through appropriate openings in the movable plate 2. The lower end of the said shaft is bent to provide an operating handle 23. Such bearings 20 may conveniently include projections 24 which cooperate with the taper 25 cut in the top and bottom edges of the fixed plate 1 whereby the sliding plate 2 is guided relatively thereto, as is clearly indicated in Figure 1.

To operate the machine, a pair of spool cases with their enclosed film are slipped upon the free ends of the spool spindles 6 and 7, the gate having been previously opened by means of the operating handle 23. As the spools are slipped on their spindles the film passes readily over the curved edges of the rear portion 4 of the gate being prevented from projecting too far forwards and thus fouling the sprocket 8, by means of the nose guide or stripper plate 9 whose rearwardly directed curved edge co-operates with that of the gate portion to guide the film smoothly into the gate proper. The rear portion 4 of the gate is grooved with the depression 15 to receive the film in its proper position. The gate is then closed by the movement of the handle 23 the crank arms 22 bearing against the sides of the openings 21, and the approach of the rear portion 4 towards the front 5 causes the guide rollers 11 and 12 for the film to press the latter closely around the periphery of the sprocket 8 as the latter enters and passes through the opening 10 in the rear portion 4 of the gate. Conveniently the two film spool cases may be mounted together with a connecting bridge to constitute a single unit carrying the film so that the film spools are never taken out of the cases when once mounted therein. If desired, any other type of magazine may be employed, such as that described and claimed in our United States Patent Number 1,440,173 granted December 26, 1922, or the conventional open reels may be used.

When the film has been run through, the gate may be opened and the movement of the sliding plate 2 moves the rear gate section 4 away from the front section 5 and the stripping plate 9 bodily removes the film from the teeth of the sprocket 8.

Operating mechanism for the spindles 6 and 7 and the sprocket 8 may be provided as is described and claimed in our said parent application, Serial Number 542,898, filed in the United States Patent Office March 11, 1922, or in our copending application, Serial Number 392,889, filed September 16, 1929, which is a continuation in part of said parent application, or in any desired manner.

Certain of the advantages of our invention are stated above or are evident from the foregoing portion of this specification. Other advantages include the provision of an improved form of gate, film removing member, and control means therefor, such mechanism being effective positively to remove the film from the film moving means when the gate is opened and to assist in the initial positioning of the film relative to said moving means and within the gate.

We claim:

1. Film handling apparatus having the film gate constructed in two separate sections, one of which is movable relative to the other for the purpose of opening or closing the gate, one of said sections being so constructed as normally to hold the film in driven engagement with a member which is so situated as to project through said other section for the purpose of driving the film, said first mentioned section being so constructed that such movement thereof causes the film to be engaged with and disengaged from said film driving member.

2. Film handling apparatus having the film gate constructed in two separate sections, one of which is movable relative to the other for the purpose of opening or closing the gate, one of said sections being so constructed as normally to hold a perforated film in driven engagement with a toothed member which is so situated as to project through said other section for the purpose of driving the film, said first mentioned section being so constructed that movement thereof for the purpose of opening the gate causes the film to be disengaged from the teeth of said film driving member.

3. In a film handling apparatus, film carrying means, film feeding means, means for bodily removing a film from said feeding means, an openable gate through which the film travels, and control means effective in timed relation for opening said gate and for actuating said means for bodily removing the film from said feeding means.

4. In a film handling apparatus, film carrying means, film feeding means, means for bodily removing a film from said feeding means, an openable gate through which the film travels, and a single control means effective for opening said gate and for actuating said means for bodily removing the film from said feeding means.

5. In a film handling apparatus, film carrying means, film feeding means, means for bodily removing a film from said feeding means, an openable gate through which the film travels, and control means effective for opening said gate and actuating said means for bodily removing the film from said feeding means, said means for bodily removing the film being effective for guiding the film relative to said feeding means during the initial positioning of the film in said gate.

6. In a film handling apparatus, an openable gate, means to feed a film therethrough, means for the bodily removal of the film from said feeding means, and control means effective for opening said gate and actuating said means for removing the film.

7. In a film handling apparatus, film carrying means, film feeding means including a sprocket, means for the bodily removal of a film from said sprocket, an openable gate through which the film travels, and control means effective for opening said gate and actuating said means for removing the film from said sprocket.

8. In a film handling apparatus, film carrying means, film feeding means, means for the bodily removal of the film from said feeding means, an openable gate through which the film travels, and control means effective for opening said gate, actuating said film removal means, and rendering said feeding means inaccessible by the film.

9. In a film handling apparatus, means positively to feed a perforated film to project or expose the same, an openable gate through which said film is fed, means to bring said film into operative relation with said feeding mechanism, means bodily to remove said film from said feeding mechanism, and mechanism assuring the operation of said means to bring said film into operative relation with said film feeding mechanism in timed relation to the closing of said gate and the operation of said means for bodily removing said film from said feeding mechanism in timed relation to the opening of said gate.

10. In a film handling apparatus, a gate, means to feed a film therethrough, and means effective to remove the film from said feeding means when said gate is opened.

11. In a film handling apparatus, a gate comprising a fixed section and a section movable relatively thereto, means to feed a film between said sections, and a member which removes the film from said feeding means when said movable section is moved away from said fixed section.

12. In a film handling apparatus, a gate comprising sections one of which is movable relatively to another, a toothed member for feeding a film between said sections, and a member, operated by the movement of said movable section, which bodily removes the film from the teeth of said feeding member.

13. In a film handling apparatus, a gate comprising sections one of which is movable relatively to another, a toothed member for feeding a film between said sections, and a member, mounted upon said movable member, which bodily removes the film from the teeth of said feeding member when said movable member is moved.

14. In a film handling apparatus, a movable gate section, a toothed film feeding member cooperating therewith, means for removing a film from the teeth of said feeding member, and an operating connection between said section and said means.

15. In a film handling apparatus, a gate, means for feeding a film therethrough, and means for removing the film from said feeding means, said gate comprising a fixed section and a section movable relatively thereto, and said film removing means comprising a member which is movable between said film feeding means and said fixed section across the path through which the film is normally fed between said sections whereby the film is removed from said feeding means.

16. In a film handling apparatus, a gate comprising a fixed section and a section movable relatively thereto, a toothed member for feeding a perforated film between said sections, means for the bodily removal of the film from the teeth of said feeding member, and operating mechanism for said movable section and said removal means, said operating mechanism being effective to position said movable section in relatively close relation to said fixed gate section and said removal means at one side of the film track so established between said sections whereby a free passage for the longitudinal movement of the film therebetween and access to the perforations of the film by the teeth of said feeding member is afforded or to move said movable section away from said fixed section and to move said film removal means across such film track whereby the film is bodily removed from the teeth of said feeding member.

17. In a film handling apparatus, a gate comprising sections one of which is movable relatively to another, a toothed member for feeding a film between said sections, and a member which, when said movable section is moved from a cooperative to a distant position relative to that of said other section bodily removes the film from the teeth of said feeding member and, when in such relatively distant position, is adapted to assist in the initial positioning of a film in said apparatus.

18. In a film handling apparatus, a gate comprising sections one of which is movable relatively to another, a toothed member for feeding a film between said sections, and a member which, when said movable section is moved from a cooperative to a distant position relative to said other section, bodily removes the film from the teeth of said feeding member and, when in such distant position, is adapted to guide the film relatively to said feeding member.

19. In a film handling apparatus, an openable gate, a toothed member for feeding a film therethrough, and a member adapted for guiding the film relative to said gate during the initial positioning of the film therein and thereafter for removing the film from the teeth of said feeding member.

20. In a film handling apparatus, a gate comprising a fixed section and a section movable relatively thereto, means for feeding a film between said sections, and a member for bodily removing the film from said feeding means, one of said gate sections and said member comprising cooperating curved surfaces for guiding the film during the initial positioning thereof in the apparatus.

21. Film handling apparatus including an openable gate and mechanism effective to open said gate, said mechanism comprising a first member which is rotatable, a second member which is longitudinally movable, means connecting said first and second members, and means to rotate said first member, whereby the rotation of said first member causes the longitudinal movement of said second member.

22. Film handling apparatus comprising means to feed a film, means bodily to remove a film from said feeding means, and control mechanism for said film removing means, said control mechanism comprising a first member which is rotatable, a second member which is longitudinally movable, connecting means between said first and second members, and means to rotate said first member, whereby the rotation of said first member causes the longitudinal movement of said second member.

23. In a film handling apparatus in combination a film-gate constructed in two separate portions, a front portion and a rear portion, a fixed support for one of said portions, a slidable support for the other said portion movable in guides relatively to said fixed support in a direction along the optical axis of the machine, a spindle journalled in bearings on said slidable support, a pair of fixed arms on said spindle pivotally engaging at their free ends slots in said fixed support, and means for turning said spindle about the free ends of said arms to effect relative sliding movement between said supports.

24. In a film handling apparatus, an openable gate, means for feeding a film through said gate, means for bodily removing the film from said feeding means, and control means for opening said gate and operating said removing means, said removing means being so positioned after having been moved to operative position as to render said feeding means inaccessible by the film.

25. In a film handling apparatus, an openable gate, a toothed member for feeding a film through said gate, and means effective upon opening said gate for rendering the teeth of said member inaccessible by the film.

26. In a film handling apparatus, a main frame, a gate section fixed on one side of said frame and extending laterally therefrom, a movable gate section supported by said side of said frame and arranged to coact with said fixed section to form a film guideway, and mechanism for moving said movable section toward and from said fixed section, said mechanism comprising a control handle remote from said movable section and at the same side of said frame as that on which said gate sections are supported, and actuating connections extending from said control handle to the other side of said frame and connected to that side of said movable section which is adjacent said frame, whereby lateral access to such guideway is provided.

27. In a film handling apparatus, a gate section fixed on one side of said frame and extending laterally therefrom, a plurality of movable guide members supported by said side of said frame and arranged to coact with said fixed section to form a film guideway, and mechanism for moving said guide members, said mechanism comprising a control handle remote from said members and at the same side of said frame as that on which said members are supported, and actuating connections extending from said control handle to the other side of said frame and connected to that side of said movable section which is adjacent said frame, whereby lateral access to such guideway is provided.

28. Film handling apparatus, comprising toothed film feeding means, a movable film engaging member cooperating therewith, and means to move said member whereby said member is effective both to remove the film bodily from the teeth of said feeding means and to protect it therefrom.

29. In a film handling apparatus, an openable gate, toothed means to feed a film through said gate, and movable film engaging means necessarily effective when said gate is open to protect the film from the teeth of said feeding means.

Signed at London, England, this 6th day of September, A. D. 1929.

H. G. PONTING.
GEORGE WILLIAM FORD.